United States Patent
Xu

(10) Patent No.: US 10,326,311 B2
(45) Date of Patent: Jun. 18, 2019

(54) WIRELESS ENERGY TRANSMISSION METHODS AND WIRELESS ENERGY SENDING DEVICES

(71) Applicant: Beijing Zhigu Rui Tuo Tech Co., Ltd, Beijing (CN)

(72) Inventor: Ran Xu, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 211 days.

(21) Appl. No.: 15/306,076

(22) PCT Filed: Mar. 12, 2015

(86) PCT No.: PCT/CN2015/074070
§ 371 (c)(1),
(2) Date: Oct. 21, 2016

(87) PCT Pub. No.: WO2015/161723
PCT Pub. Date: Oct. 29, 2015

(65) Prior Publication Data
US 2017/0047788 A1  Feb. 16, 2017

(30) Foreign Application Priority Data
Apr. 23, 2014 (CN) .......................... 2014 1 0165825

(51) Int. Cl.
*H02J 1/14* (2006.01)
*H02J 7/02* (2016.01)
(Continued)

(52) U.S. Cl.
CPC .............. *H02J 50/12* (2016.02); *H02J 7/025* (2013.01); *H02J 50/20* (2016.02); *H02J 50/40* (2016.02); *H02J 50/80* (2016.02); *H02J 1/14* (2013.01)

(58) Field of Classification Search
CPC ............ H02J 50/12; H02J 50/20; H02J 50/40; H02J 7/025
See application file for complete search history.

(56) References Cited

U.S. PATENT DOCUMENTS 8,410,953 B2   4/2013   Zeine
8,446,248 B2   5/2013   Zeine
(Continued)

FOREIGN PATENT DOCUMENTS

CN   101711450 A   5/2010
CN   101986508 A   3/2011
(Continued)

OTHER PUBLICATIONS

International Search Report for PCT Application No. PCT/CN2015/074070, dated Jun. 17, 2015, 5 pages.

*Primary Examiner* — Jeffrey M Shin
(74) *Attorney, Agent, or Firm* — Amin, Turocy & Watson, LLP

(57) ABSTRACT

Wireless energy transmission methods and wireless energy sending devices are provided. The wireless energy transmission method comprises: transmitting wireless energy to a first wireless energy receiving device with the minimum remaining energy level among multiple wireless energy receiving devices; and in a case where a value by which a remaining energy level of the first wireless energy receiving device is higher than a remaining energy level of a second wireless energy receiving device among the multiple wireless energy receiving devices exceeds a preset value, stopping transmitting wireless energy to the first wireless energy receiving device and starting to perform wireless energy transmission on the second wireless energy receiving device. The methods and the devices in at least one embodiment of the present application can implement balanced states of charge for wireless energy receiving devices in a (Continued)

wireless energy transmission process, and make it convenient for a user to use multiple wireless energy receiving devices.

20 Claims, 7 Drawing Sheets

(51) Int. Cl.
    *H02J 50/12* (2016.01)
    *H02J 50/20* (2016.01)
    *H02J 50/40* (2016.01)
    *H02J 50/80* (2016.01)

(56) References Cited

U.S. PATENT DOCUMENTS

| | | | |
|---|---|---|---|
| 8,723,642 | B2 | 5/2014 | Park et al. |
| 8,836,279 | B2 | 9/2014 | Nakano |
| 2012/0313446 | A1* | 12/2012 | Park .................. H02J 5/005 307/104 |
| 2014/0035379 | A1* | 2/2014 | Stevens ............... H02J 7/0013 307/104 |
| 2014/0217967 | A1* | 8/2014 | Zeine .................. H02J 7/025 320/108 |
| 2014/0354052 | A1 | 12/2014 | Masaoka et al. |

FOREIGN PATENT DOCUMENTS

| | | |
|---|---|---|
| CN | 102208836 A | 10/2011 |
| CN | 102760332 A | 10/2012 |
| CN | 103944282 A | 7/2014 |
| CN | 103944283 A | 7/2014 |
| CN | 103972993 A | 8/2014 |
| JP | 2007089341 A | 4/2007 |
| WO | 2013098948 A1 | 7/2013 |
| WO | 2013119395 A1 | 8/2013 |
| WO | 2015161724 A1 | 10/2015 |
| WO | 2015161725 A1 | 10/2015 |

* cited by examiner

WIRELESS ENERGY TRANSMISSION METHODS AND WIRELESS ENERGY SENDING DEVICES

RELATED APPLICATION

The present international patent cooperative treaty (PCT) application claims the benefit of priority to Chinese Patent Application No. 201410165825.9, filed on Apr. 23, 2014, and entitled "Wireless Energy Transmission Method and Wireless Energy Sending Device", which is hereby incorporated into the present international PCT application by reference herein in its entirety.

TECHNICAL FIELD

The present application relates to the field of wireless energy transmission, and in particular, to wireless energy transmission methods and wireless energy sending devices.

BACKGROUND

In wireless charging/power supply technologies, an energy sending device and an energy receiving device may perform energy transmission in a wireless manner. An existing wireless charging/power supply technology comprises an inductive coupling technology, a magnetic resonance technology, and a microwave energy transmission technology, and the like. The inductive coupling technology and the magnetic resonance technology are applicable to a short distance (centimeter level) wireless charging/power supply application scenario, whereas the microwave energy transmission technology may implement wireless energy transmission between an energy sending device and an energy receiving device in a long distance (the maximum distance is about 10 meters) application scenario.

FIG. 1 shows a working principle of a microwave energy transmission technology. In a wireless energy transmission system shown in FIG. 1, a wireless energy sending device 330a comprises a power source 300, a communications module 320, control logic 310, and a microwave array 101a, and a wireless energy receiving device 330b comprises a rectifier 340, control logic 350, a communications module 360, and a battery 370. The wireless energy sending device 330a transmits energy 301 to the wireless energy receiving device 330b in a wireless microwave manner. The microwave array 101a in the wireless energy sending device 330a comprises multiple phase adjustable emitter nodes, for example, up to 20000 emitter nodes, which are configured to send the energy 301, and the rectifier 340 in the wireless energy receiving device 330b receives the energy 301, so as to supply power to the battery 370 in the wireless energy receiving device 330b. At the beginning as a wireless energy transmission relationship starts to be established between the wireless energy sending device 330a and the wireless energy receiving device 330b, the microwave array 101a in the wireless energy sending device 330a adjusts phases of the emitter nodes one by one, so that each emitter node is adjusted to an optimal phase of performing wireless energy transmission to achieve an optimal wireless energy transmission effect. The foregoing process is referred to as a "phase calibration stage". In the phase calibration stage, the communications module 360 in the wireless energy receiving device 330b continuously sends a feedback signal to the communications module 320 of the wireless energy sending device 330a by using a wireless data communication channel, so as to report, to the wireless energy sending device 330a, wireless energy transmission intensity (or wireless energy transmission power) received by the rectifier 340. The control logic 310 in the wireless energy sending device 330a adjusts the phases of the emitter nodes in the microwave array 101a one by one on the basis of the feedback signal, until the wireless energy transmission intensity reported by the communications module 360 in the wireless energy receiving device 330b becomes maximal, and the phase calibration stage ends.

As shown in FIG. 2, when multiple wireless energy receiving devices Rx exist in a wireless energy transmission range of one wireless energy sending device Tx; for example, multiple terminal devices in a user's room need to be charged. The multiple wireless energy receiving devices Rx perform wireless energy transmission with the wireless energy sending device Tx in a sharing manner. In such a process, the wireless energy sending device Tx may perform energy transmission on the wireless energy receiving devices Rx in turn within a same or close transmission time. Every time when a wireless energy receiving device Rx that receives energy is switched, the wireless energy sending device Tx performs phase calibration on all emitter nodes to achieve an optimal energy transmission effect.

However, in many scenarios, a user intends to keep relatively balanced states of charge for multiple charged devices, the foregoing sharing manner cannot meet the foregoing needs of the user.

SUMMARY

An example, non-limiting objective of the present application is to provide a wireless energy transmission technology.

According to an example aspect of the present application, a wireless energy transmission method is provided, where the method comprises:
  performing wireless energy transmission on a first wireless energy receiving device with the minimum remaining energy level among multiple wireless energy receiving devices; and
  in a case where a value by which a remaining energy level of the first wireless energy receiving device is higher than a remaining energy level of a second wireless energy receiving device among the multiple wireless energy receiving devices exceeds a preset value, stopping performing wireless energy transmission on the first wireless energy receiving device and starting to perform wireless energy transmission on the second wireless energy receiving device.

According to another example aspect of the present application, a wireless energy sending device is further provided, where the device comprises:
  a wireless energy transmission module, configured to perform wireless energy transmission on at least one wireless energy receiving device; and
  a control module, configured to control the wireless energy transmission module to perform wireless energy transmission on a first wireless energy receiving device with the minimum remaining energy level among multiple wireless energy receiving devices, where
  the control module is further configured to control the wireless energy transmission module to: in a case where a value by which a remaining energy level of the first wireless energy receiving device is higher than a remaining energy level of a second wireless energy receiving device among the multiple wireless energy receiving devices exceeds a preset value, stop performing wireless energy transmission on the first wireless energy receiving device and start to perform wireless energy transmission on the second wireless energy receiving device.

The methods and the devices of the present application can implement balanced states of charge for wireless energy receiving devices in a wireless energy transmission process, and make it convenient for a user to use multiple wireless energy receiving devices.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
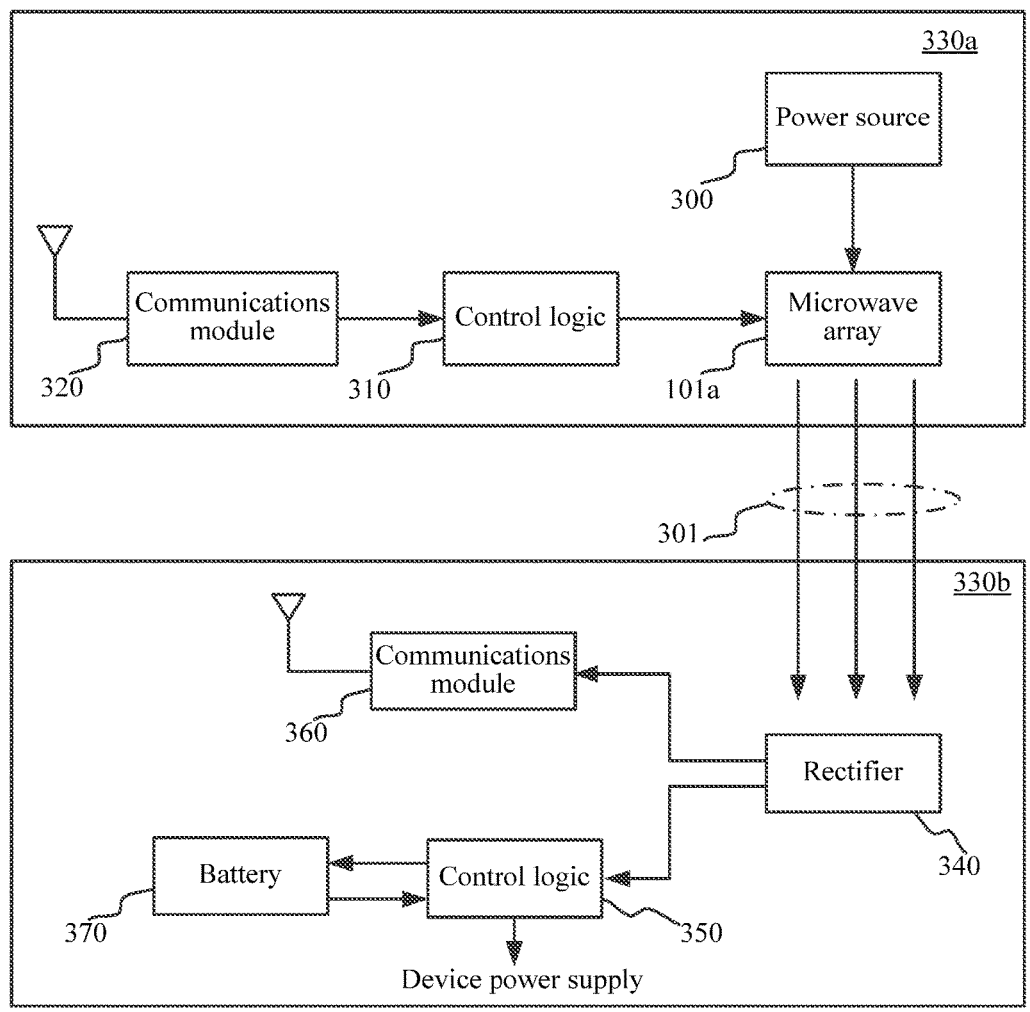
FIG. 1 is an example diagram of a working principle of a microwave energy transmission technology in the prior art.
Figure 2:
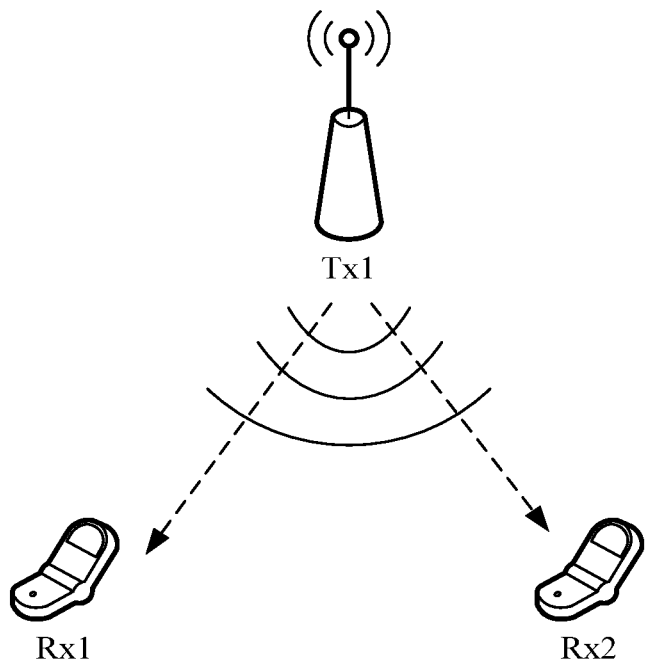
FIG. 2 is an example schematic diagram that one wireless energy sending device performs wireless energy transmission on multiple wireless energy receiving devices in the prior art.

Various embodiments of the present application are further described in detail below with reference to the accompanying drawings (same reference numerals in several accompanying drawings represent same elements) and embodiments. The following embodiments are for describing the present application, but are not intended to limit the scope of the present application.

A person skilled in the art may understand that the terms such as "first" and "second" in the present application are merely for differentiating different steps, devices, modules, or the like, and neither represent any specific technical meanings nor represent a certain logic sequence among them.

In the embodiments of the present application, multiple wireless energy receiving devices may exist in a wireless energy transmission range of a wireless energy sending device, and a wireless energy transmission relationship occurs between the multiple wireless energy receiving devices and the wireless energy sending device in a sharing manner. To keep relatively balanced states of charge for the multiple wireless energy receiving devices, reference may be made to remaining energy levels of the wireless energy receiving devices, and a specific strategy is used to enable the wireless energy sending device to preferentially perform energy transmission on a wireless energy receiving device with a relatively low remaining energy level, so as to ensure balanced charging of the devices.

Figure 3:
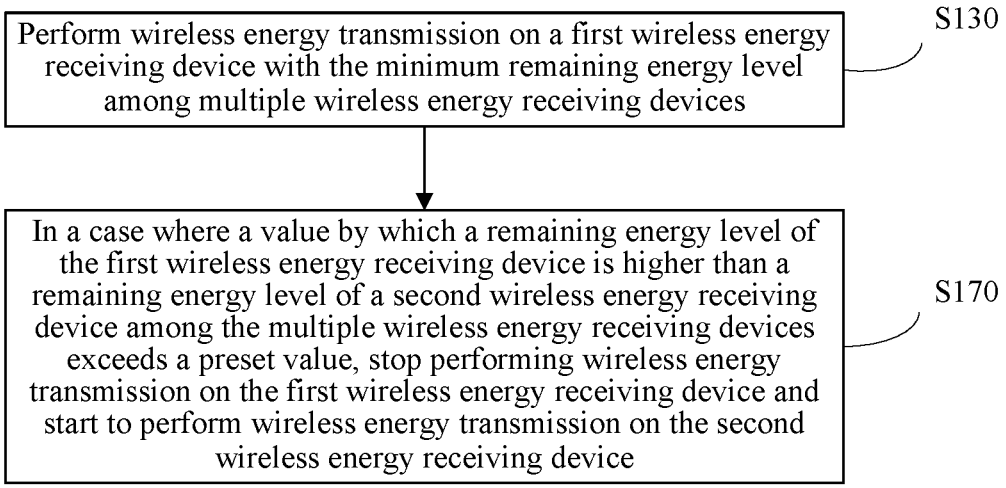
FIG. 3 is an example flowchart of steps of a wireless energy transmission method in an embodiment of the present application.

As shown in FIG. 3, a wireless energy transmission method is provided according to an embodiment of the present application. The method may be implemented by a wireless energy sending device in a wireless energy transmission system, so as to perform wireless energy transmission on multiple wireless energy receiving devices in the system. The method comprises:

S130: Perform wireless energy transmission on a first wireless energy receiving device with the minimum remaining energy level among multiple wireless energy receiving devices.

S170: In a case where a value by which a remaining energy level of the first wireless energy receiving device is higher than a remaining energy level of a second wireless energy receiving device among the multiple wireless energy receiving devices exceeds a preset value, stop performing wireless energy transmission on the first wireless energy receiving device and start to perform wireless energy transmission on the second wireless energy receiving device.

Next, the functions of the steps in a wireless energy transmission method in this embodiment are described in detail with reference to FIG. 3 to FIG. 5.

S130: Perform wireless energy transmission on a first wireless energy receiving device with the minimum remaining energy level among multiple wireless energy receiving devices.

Figure 4:
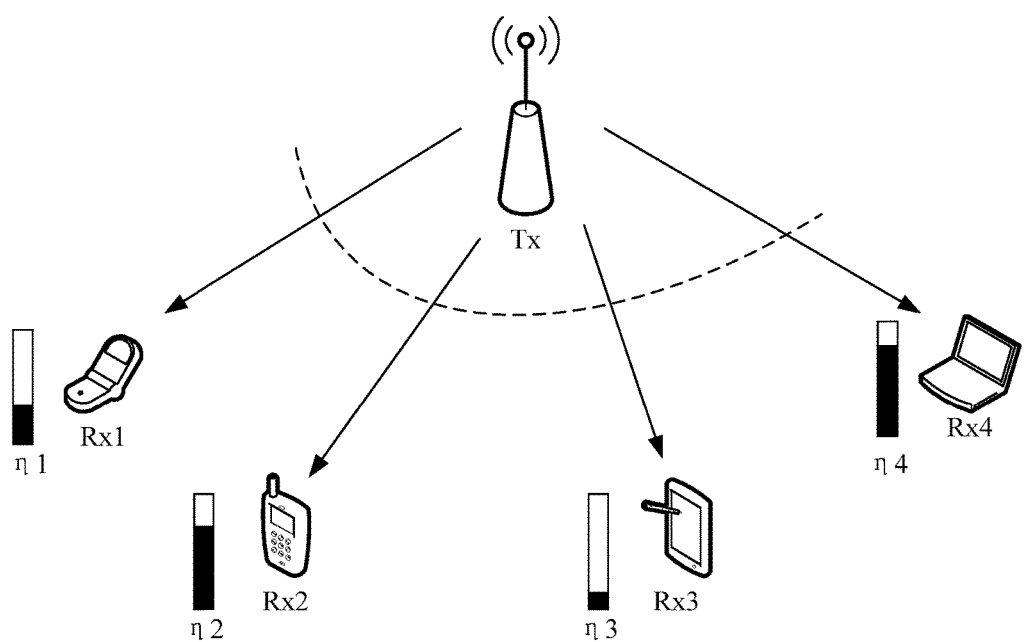
FIG. 4 is an example diagram of an example of a wireless energy transmission system to which a wireless energy transmission method in an embodiment of the present application is applicable.

FIG. 4 shows an example of a wireless energy transmission system to which the method in this embodiment is applicable. The system comprises one wireless energy sending device Tx and multiple wireless energy receiving devices Rx. FIG. 4 exemplarily shows 4 wireless energy receiving devices Rx1, Rx2, Rx3, and Rx4. In this embodiment, the wireless energy sending device Tx may adjust phases of multiple emitter nodes in a microwave array of the wireless energy sending device Tx to perform wireless energy transmission on any one of the multiple wireless energy receiving devices Rx, so as to achieve optimal energy transmission effects of the corresponding wireless energy receiving devices. When the wireless energy sending device switches an energy transmission target of the wireless energy sending device and starts to perform wireless energy transmission on another wireless energy receiving device instead, the wireless energy sending device needs to readjust the phases of the multiple emitter nodes in the microwave array of the wireless energy sending device to achieve an optimal energy transmission effect corresponding to another wireless energy receiving device.

To achieve relatively balanced states of charge for the multiple wireless energy receiving devices Rx, in S130 in the method in this embodiment, the wireless energy sending device Tx selects one with the minimum remaining energy level among the multiple wireless energy receiving devices Rx to perform wireless energy transmission, to cause the state of charge of the wireless energy receiving device to approach those of other wireless energy receiving devices.

To determine one with the minimum remaining energy level among the multiple wireless energy receiving devices Rx, in an example embodiment, the method in this embodiment may further comprise S120: Determine, according to energy information related to remaining energy levels of the multiple wireless energy receiving devices, a wireless energy receiving device with the minimum remaining energy level among the multiple wireless energy receiving devices.

As shown in FIG. 4, a corresponding remaining energy level is shown next to each of the 4 wireless energy receiving devices, energy information that reflects the remaining energy level may be checked and considered to determine the wireless energy receiving device with the minimum remaining energy level. The energy information may be a remaining energy value of a wireless energy receiving device, for example, a percentage of current charge relative to full charge of a device, or may also be a current voltage value of a device battery, or the like.

In an example embodiment, the method in this embodiment may further comprise S110: Acquire the energy information of the multiple wireless energy receiving devices. In an example embodiment of the present application, a wireless energy sending device Tx may directly acquire energy information of the multiple wireless energy receiving devices Rx from the multiple wireless energy receiving devices Rx separately, so as to learn respective remaining energy levels of the multiple wireless energy receiving devices Rx, or the multiple wireless energy receiving devices Rx may also first send respective energy information to an independent device, and the wireless energy sending device Tx then acquires the respective energy information from the independent device. A person skilled in the art may understand that, because the energy information reflects a current remaining energy level of each wireless energy receiving device Rx, in the process of implementing this method, the wireless energy sending device Tx may acquire the energy information in real time to learn a latest remaining energy level of each wireless energy receiving device Rx, so as to provide a real-time basis for device selection for wireless energy transmission.

In this embodiment, Table 1 may be constructed on the basis of the acquired energy information to collectively reflect a remaining energy level of each wireless energy receiving device Rx:

TABLE 1

| Device Identifier (ID) | Remaining Energy Level |
|---|---|
| Rx1 | η1 |
| Rx2 | η2 |
| Rx3 | η3 |
| Rx4 | η4 |

In Table 1 above, η is used to represent energy information of a wireless energy receiving device Rx, which reflects a remaining energy level of a corresponding wireless energy receiving device Rx. A person skilled in the art may understand that, as the wireless energy sending device Tx acquires the energy information in real time, the value of the remaining energy level in Table 1 is also updated in real time with the continuous acquisition of the energy information.

In the example shown in FIG. 4, in Table 2 below, a percentage of current charge relative to full charge of each wireless energy receiving device Rx is used as an example to reflect a current remaining energy level of each wireless energy receiving device Rx:

TABLE 2

| Device Identifier (ID) | Remaining Energy Level |
|---|---|
| Rx1 | 20% |
| Rx2 | 80% |
| Rx3 | 5% |
| Rx4 | 90% |

According to a remaining energy level of each wireless energy receiving device reflected by energy information in Table 2, it may be determined that Rx3 is the wireless energy receiving device with the minimum remaining energy level in the system. Therefore, in S130, the wireless energy sending device Tx performs wireless energy transmission on the wireless energy receiving device Rx3.

In this embodiment, the wireless energy sending device performs wireless energy transmission alternately on the multiple wireless energy receiving devices by using a certain strategy. Every time when the wireless energy sending device starts to perform wireless energy transmission on a wireless energy receiving device, a "phase adjustment stage" is required, so as to adjust phases of all emitter nodes in the microwave array of the wireless energy sending device one by one to achieve an optimal energy transmission effect for the wireless energy receiving device. In a case where the positions of the wireless energy sending device and the wireless energy receiving device stay unchanged, every time when phase adjustment is performed on the wireless energy receiving device, the phase adjustment on all the emitter nodes in the microwave array has the same result.

Therefore, in an example embodiment, the method in this embodiment further comprises S140: Record, when wireless energy transmission is performed on a wireless energy receiving device, phase information of multiple emitter nodes in the wireless energy sending device. In this way, when energy transmission is performed on a wireless energy receiving device, phase information of all emitter nodes of the wireless energy sending device at this time are synchronously recorded. When the wireless energy sending device transmits energy to the wireless energy receiving device again in the future, phase adjustment may be directly performed according to recorded phase information without needing to undergo a "phase adjustment stage". In this way, a phase adjustment process of the wireless energy sending device is significantly simplified, thereby improving energy transmission efficiency.

In consideration of the foregoing factor, phase information corresponding to each wireless energy receiving device may be further added on the basis of Table 1 to form Table 3 below. With reference to Table 3, a current remaining energy level of each wireless energy receiving device and optimal energy transmission phase information of the wireless energy sending device corresponding to the current remaining energy level may be learned at the same time:

TABLE 3

| Device Identifier (ID) | Remaining Energy Level | Phase Information |
|---|---|---|
| Rx1 | η1 | θ1 |
| Rx2 | η2 | θ2 |
| Rx3 | η3 | θ3 |
| Rx4 | η4 | θ4 |

In Table 3 above, θ is used to represent phase information corresponding to a wireless energy receiving device Rx, where the phase information reflects an optimal phase adjust result when the wireless energy sending device Tx transmits energy to the wireless energy receiving device Rx. A person skilled in the art may understand that, because the microwave array comprises multiple emitter nodes, and each piece of phase information θ in Table 3 is a phase angle sequence formed by multiple phase angles, and the number of phase angles in the sequence is the same as the number of the emitter nodes in the microwave array.

In the example shown in FIG. 4, when the wireless energy sending device Tx completes the phase calibration stage and starts to perform wireless energy transmission on the wireless energy receiving device Rx3, phase information θ3 of the wireless energy sending device Tx at this time is recorded. Energy has not been transmitted to other wireless energy receiving devices, and therefore phase information corresponding to the other wireless energy receiving devices is not available (N/A). As shown in Table 4 below:

TABLE 4

| Device Identifier (ID) | Remaining Energy Level | Phase Information |
|---|---|---|
| Rx1 | 20% | N/A |
| Rx2 | 80% | N/A |
| Rx3 | 5% | θ3 |
| Rx4 | 90% | N/A |

S170: In a case where a value by which a remaining energy level of the first wireless energy receiving device is higher than a remaining energy level of a second wireless energy receiving device among the multiple wireless energy receiving devices exceeds a preset value, stop performing wireless energy transmission on the first wireless energy receiving device and start to perform wireless energy transmission on the second wireless energy receiving device.

As the wireless energy sending device continuously performs wireless energy transmission on a wireless energy receiving device with the minimum remaining energy level. For example, the wireless energy sending device Tx in FIG. 4 transmits energy to the wireless energy receiving device Rx3, and a remaining energy level of the wireless energy receiving device Rx3 continuously rises and even exceeds other wireless energy receiving devices (according to Table 2, the remaining energy level of Rx3 should first exceed a remaining energy level 20% of Rx1). In this case, the wireless energy receiving device Rx3 becomes no longer the wireless energy receiving device with the minimum remaining energy level. To keep relatively balanced states of charge for the multiple wireless energy receiving devices in the system, in this case, an energy transmission target of the wireless energy sending device should be switched, and wireless energy transmission is performed on a current wireless energy receiving device with the minimum remaining energy level instead.

A person skilled in the art may understand that if a remaining energy level of a wireless energy receiving device that receives energy transmission exceeds that of another wireless energy receiving device, an energy transmission target of the wireless energy sending device is switched immediately, and excessively frequent switching occurs to lower wireless energy transmission efficiency of the entire system. Therefore, in S170 in the method in this embodiment, reference is made to a preset value, and the foregoing switching is performed only in a case where a value by which a remaining energy level of a wireless energy receiving device on which energy transmission is being performed is higher than a remaining energy level of another wireless energy receiving device exceeds the preset value, and wireless energy transmission starts to be performed on the another wireless energy receiving device.

In an example embodiment, the method in this embodiment further comprises S150: Determine, according to energy information of the multiple wireless energy receiving devices, whether a value by which a remaining energy level of a wireless energy receiving device on which energy transmission is being performed is higher than a remaining energy level of another wireless energy receiving device exceeds the preset value. The meaning of the energy information and the manner of acquiring the energy information have been introduced above, and are no longer elaborated here.

In an example embodiment, the preset value may be set by a person skilled in the art according to a practical need. For example, in a case where a percentage of current charge relative to full charge of each wireless energy receiving device Rx is used to reflect a current remaining energy level of each wireless energy receiving device Rx, the preset value may be set to any value between 5% and 10%. Correspondingly, the method in this embodiment may further comprise S160: Set the preset value. A person skilled in the art may understand that when the preset value is set smaller, an energy transmission target of the wireless energy sending device is switched more frequently, and correspondingly, as wireless energy transmission progresses, states of charge for wireless energy receiving devices are more balanced.

In the example shown in FIG. 4, when the preset value is set to 10%, as the wireless energy sending device Tx transmits energy to the wireless energy receiving device Rx3, the remaining energy level of the wireless energy receiving device Rx3 keeps increasing from 5%. When the remaining energy level of the wireless energy receiving device Rx3 increases to 30%, a value by which the remaining energy level of the wireless energy receiving device Rx3 is higher than the remaining energy level 20% of the wireless energy receiving device Rx1 exceeds the preset value 10%. In this case, the wireless energy sending device Tx stops performing wireless energy transmission on Rx3 and starts to perform wireless energy transmission on Rx1, and the energy transmission target of the wireless energy sending device Tx is switched from Rx3 to Rx1. When the wireless energy sending device Tx completes a phase calibration stage and starts to perform wireless energy transmission on the wireless energy receiving device Rx1, phase information of the wireless energy sending device Tx at this time may be recorded, and at this time the results are shown in Table 5 below:

TABLE 5

| Device Identifier (ID) | Remaining Energy Level | Phase Information |
| --- | --- | --- |
| Rx1 | 20% | θ1 |
| Rx2 | 80% | NA |
| Rx3 | 30% | θ3 |
| Rx4 | 90% | NA |

Subsequently, as the wireless energy sending device Tx transmits energy to the wireless energy receiving device Rx1, the remaining energy level of the wireless energy receiving device Rx1 keeps increasing from 20%. When the remaining energy level of the wireless energy receiving device Rx1 increases to 40%, a value by which the remaining energy level of the wireless energy receiving device Rx1 is higher than the remaining energy level of the wireless energy receiving device Rx3 30% exceeds the preset value 10% again. In this case, the wireless energy sending device Tx stops performing wireless energy transmission on Rx1 and starts to perform wireless energy transmission on Rx3, and the energy transmission target of the wireless energy sending device Tx is switched from Rx1 back to Rx3.

Similarly, the method in this embodiment is executed continuously and repeatedly in the system, the wireless energy sending device performs wireless energy transmission on a wireless energy receiving device with the minimum remaining energy level in the system, until a value by which a remaining energy level of the wireless energy receiving device is higher than a remaining energy level of another wireless energy receiving device exceeds a preset value, and the energy transmission target of the wireless energy sending device is switched to another wireless energy receiving device with the minimum remaining energy level currently.

Figure 5:
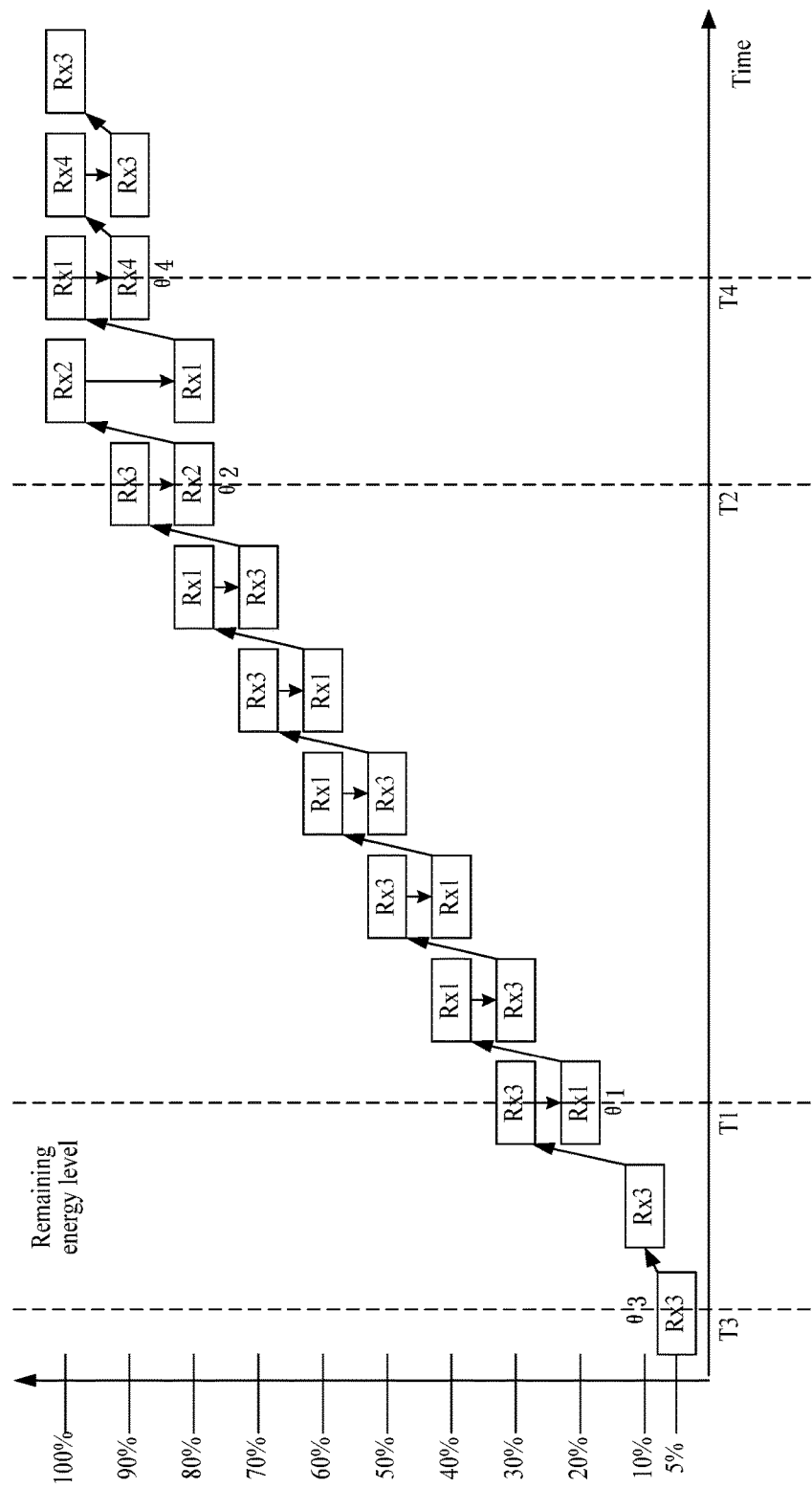
FIG. 5 is an example timing diagram of executing a wireless energy transmission method in an embodiment of the present application.

FIG. 5 is a timing diagram that the method in this embodiment is executed continuously in the system in FIG. 4. FIG. 5 shows a specific switching process for the energy transmission target of the wireless energy sending device Tx, and meanwhile shows moments T1 to T4 of recording phase information corresponding to the wireless energy receiving devices Rx1 to Rx4. At the moment T4 shown in FIG. 5, Table 6 below reflects at the same time a current remaining energy level of each wireless energy receiving device and optimal energy transmission phase information corresponding to the current remaining energy level:

TABLE 6

| Device Identifier (ID) | Remaining Energy Level | Phase Information |
| --- | --- | --- |
| Rx1 | 100% | θ1 |
| Rx2 | 100% | θ2 |
| Rx3 | 90% | θ3 |
| Rx4 | 90% | θ4 |

As can be seen, according to the foregoing method in this embodiment, in a process in which a wireless energy sending device continuously transmits energy to multiple wireless energy receiving devices in a system, it may be implemented that states of charge of the wireless energy receiving devices keep becoming more balanced, and charging processes for all wireless energy receiving devices may be completed within relatively close time periods. Even though energy transmission must be interrupted by other causes in the entire process, a user may also obtain a charging result of balanced states of charge for the wireless energy receiving devices, and it becomes convenient for the user to use all wireless energy receiving devices.

A person skilled in the art may understand that in the foregoing method in the example embodiment of the present application, the sequence numbers of the steps do not mean an execution sequence, and the execution sequence of the steps should be determined by the functions and internal logic of the steps rather than to cause any limitations on the implementation process of an example embodiment of the present application.

In addition, an embodiment of the present application further provides a computer readable medium, which comprises a computer readable instruction that performs the following operation when being executed: executing all steps and operations in the method in the embodiment shown in FIG. 3 above.

Figure 6:
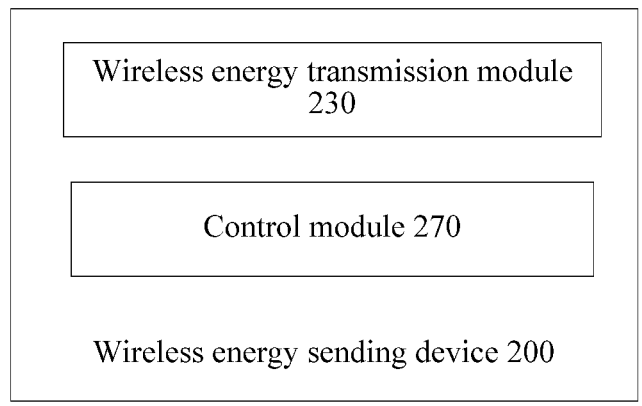
FIG. 6 is an example schematic structural diagram a wireless energy sending device in an embodiment of the present application.

As shown in FIG. 6, according to another embodiment of the present application, a wireless energy sending device 200 is provided, where the device 200 may perform wireless energy transmission on multiple wireless energy receiving devices in a wireless energy transmission system, and for example, is implemented as the wireless energy sending device Tx in FIG. 4. The device 200 comprises:

a wireless energy transmission module 230, configured to perform wireless energy transmission on at least one wireless energy receiving device; and a control module 270, configured to control the wireless energy transmission module 230 to perform wireless energy transmission on a first wireless energy receiving device with the minimum remaining energy level among multiple wireless energy receiving devices, where the control module 270 is further configured to control the wireless energy transmission module 230 to: in a case where a value by which a remaining energy level of the first wireless energy receiving device is higher than a remaining energy level of a second wireless energy receiving device among the multiple wireless energy receiving devices exceeds a preset value, stop performing wireless energy transmission on the first wireless energy receiving device and start to perform wireless energy transmission on the second wireless energy receiving device.

Next, with reference to FIG. 6 to FIG. 10, the functions of the modules in the wireless energy sending device in this embodiment are described in detail.

The wireless energy transmission module 230 is configured to perform wireless energy transmission on at least one wireless energy receiving device.

In an example embodiment, the wireless energy transmission module 230 may comprise a microwave array, and the microwave array comprises multiple emitter nodes. In a process of establishing a wireless energy transmission relationship with a wireless energy receiving device, phases of multiple emitter nodes in a microwave array of the wireless energy transmission module 230 are adjusted, so as to perform wireless energy transmission on the wireless energy receiving device, and achieve an optimal energy transmission effect corresponding to the wireless energy receiving device. When the wireless energy sending device 200 switches an energy transmission target of the wireless energy sending device 200, the wireless energy sending device 200 starts to perform wireless energy transmission on another wireless energy receiving device instead, and the phases of the multiple emitter nodes in the microwave array of the wireless energy transmission module 230 are readjusted, so as to achieve an optimal energy transmission effect corresponding to the another wireless energy receiving device.

The control module 270 is configured to control the wireless energy transmission module 230 to perform wireless energy transmission on the first wireless energy receiving device with the minimum remaining energy level among the multiple wireless energy receiving devices.

To achieve relatively balanced states of charge for the multiple wireless energy receiving devices, in an example embodiment, the control module 270 controls the wireless energy transmission module 230 to perform wireless energy transmission on one with the minimum remaining energy level among the multiple wireless energy receiving devices, to cause a state of charge of the wireless energy receiving device to approach those of other wireless energy receiving devices.

Figure 7:
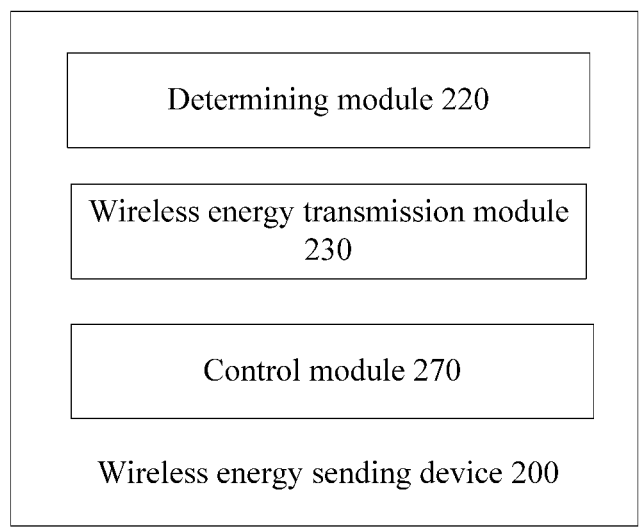
FIG. 7 is another example schematic structural diagram of a wireless energy sending device in an embodiment of the present application.

To determine one with the minimum remaining energy level among the multiple wireless energy receiving devices, in an example embodiment, as shown in FIG. 7, the device 200 in this embodiment may further comprise a determining module 220, configured to determine, according to energy information related to remaining energy levels of the multiple wireless energy receiving devices, a wireless energy receiving device with the minimum remaining energy level among the multiple wireless energy receiving devices.

Figure 8:
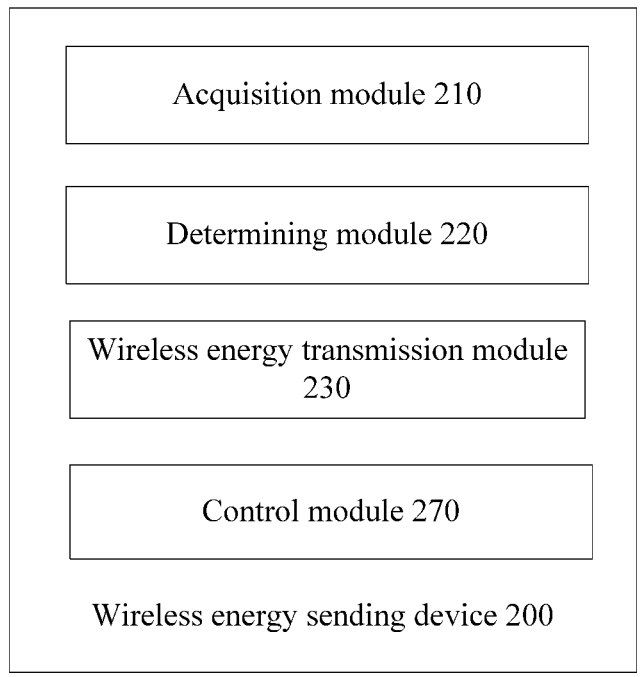
FIG. 8 is another example schematic structural diagram of a wireless energy sending device in an embodiment of the present application.

In an example embodiment, as shown in FIG. 8, the device 200 in this embodiment may further comprise an acquisition module 210, configured to acquire the energy information of the multiple wireless energy receiving devices. In an example embodiment of the present application, the acquisition module 210 may directly acquire energy information of the multiple wireless energy receiving devices from the multiple wireless energy receiving devices separately, so as to learn respective remaining energy levels of the multiple wireless energy receiving devices, or the multiple wireless energy receiving devices may also first send respective energy information to an independent device, and the acquisition module 210 then acquires the respective energy information from the independent device.

Figure 9:
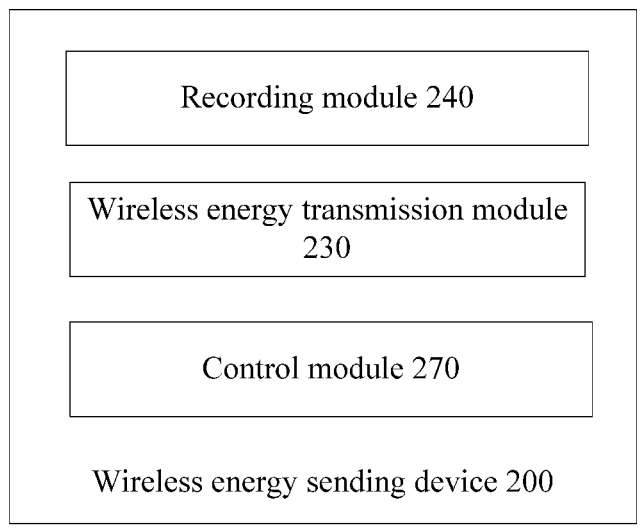
FIG. 9 is another example schematic structural diagram of a wireless energy sending device in an embodiment of the present application.

In an example embodiment, as shown in FIG. 9, the device 200 in this embodiment may further comprise a recording module 240, configured to record, when wireless energy transmission is performed on a wireless energy receiving device, phase information of the multiple emitter nodes in the wireless energy sending device. In this way, when energy transmission is performed on a wireless energy receiving device, phase information of all emitter nodes of the wireless energy sending device at this time is recorded. When the wireless energy sending device transmits energy to the wireless energy receiving device again in the future, the wireless energy sending device may directly perform phase adjustment according to the recorded phase information without needing to undergo a "phase adjustment stage". In this way, a phase adjustment process of the wireless energy sending device is significantly simplified, thereby improving energy transmission efficiency.

The control module 270 is further configured to control the wireless energy transmission module 230 to: in a case where the value by which the remaining energy level of the first wireless energy receiving device is higher than the remaining energy level of the second wireless energy receiving device among the multiple wireless energy receiving devices exceeds a preset value, stop performing wireless energy transmission on the first wireless energy receiving device and start to perform wireless energy transmission on the second wireless energy receiving device.

In the device 200 in this embodiment, the control module 270 makes a reference to the preset value, and performs the foregoing switching to control the wireless energy transmission module 230 to start to perform wireless energy transmission on the another wireless energy receiving device only in a case where a value by which a remaining energy level of a wireless energy receiving device on which energy transmission is being performed is higher than a remaining energy level of another wireless energy receiving device exceeds the preset value.

In an example embodiment, as shown in FIG. 7, the device 200 in this embodiment further comprises the determining module 220, configured to determine, according to the energy information of the multiple wireless energy receiving devices, whether a value by which a remaining energy level of a wireless energy receiving device on which energy transmission is being performed is higher than a remaining energy level of another wireless energy receiving device exceeds the preset value.

Figure 10:
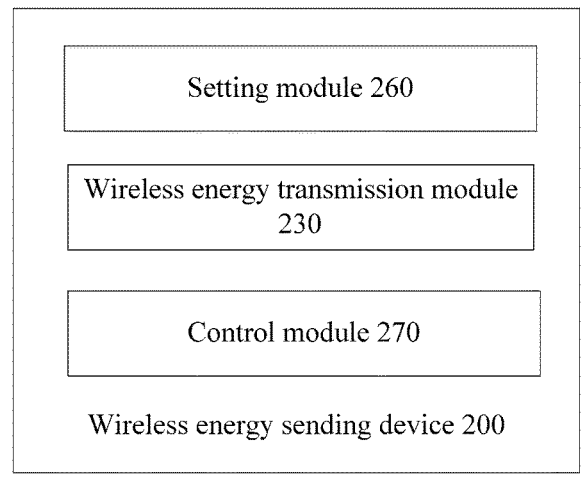
FIG. 10 is another example schematic structural diagram of a wireless energy sending device in an embodiment of the present application.

In an example embodiment, as shown in FIG. 10, the device 200 in this embodiment may further comprise a setting module 260, configured to set the preset value.

As can be seen, for the foregoing wireless energy sending device according to this embodiment, in a process of transmitting energy to the multiple wireless energy receiving devices, the device may achieve that states of charge for the wireless energy receiving devices keep becoming more balanced, and may complete a charging process for all wireless energy receiving devices within relatively close time periods. Even though energy transmission must be interrupted by other causes in the entire process, a user may also obtain a charging result of balanced states of charge for the wireless energy receiving devices, and it becomes convenient for the user to use all the wireless energy receiving devices.

Figure 11:
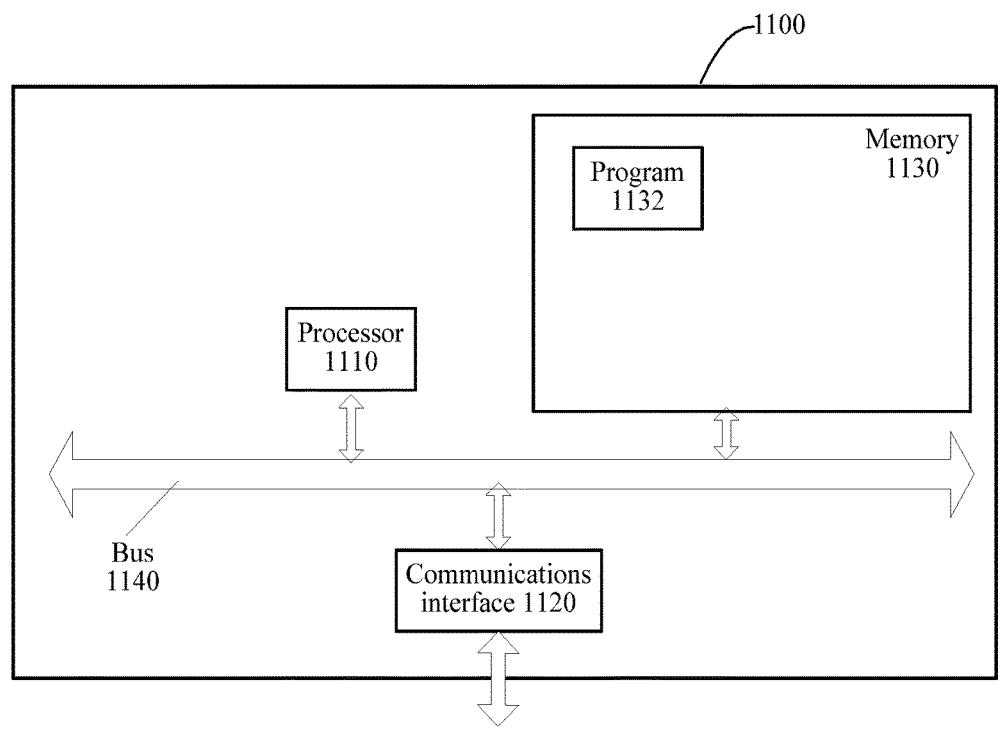
FIG. 11 is an example schematic diagram of a hardware structure of a wireless energy sending device in an embodiment of the present application.

FIG. 11 is a schematic structural diagram of a wireless energy sending device 1100 provided in an embodiment of the present application. Specific embodiments of the present application do not cause any limitation on specific implementation of the wireless energy sending device 1100. As shown in FIG. 11, the wireless energy sending device 1100 may comprise:

a processor 1110, a communications interface 1120, a memory 1130, and a communications bus 1140. Where:
the processor 1110, the communications interface 1120, and the memory 1130 accomplish communication with each other by using the communications bus 1140.

The communications interface 1120 is configured to communicate with a network element such as a client.

The processor 1110 is configured to execute a program 1132, and may specifically implement functions related to the wireless energy sending device in the device embodiments shown in FIG. 6 to FIG. 10 above.

Specifically, the program 1132 may comprise program code, and the program code comprises a computer operation instruction.

The processor 1110 may be a central processing unit (CPU), or an application specific integrated circuit (ASIC), or may be configured as one or more integrated circuits that implement the embodiment of the present application.

The memory 1130 is configured to store the program 1132. The memory 1130 may comprise a high-speed RAM memory, or may further comprise a non-volatile memory, for example, at least one magnetic disk memory. The program 1132 may specifically implement the following operations:

performing wireless energy transmission on a first wireless energy receiving device with the minimum remaining energy level among multiple wireless energy receiving devices; and in a case where a value by which a remaining energy level of the first wireless energy receiving device is higher than a remaining energy level of a second wireless energy receiving device among the multiple wireless energy receiving devices exceeds a preset value, stopping performing wireless energy transmission on the first wireless energy receiving device and starting to perform wireless energy transmission on the second wireless energy receiving device.

Reference may be made to a correspondingly step in the embodiment shown in FIG. 3 for specific implementation of each operation in the program 1132, which is no longer elaborated here. A person skilled in the art may clearly understand that for convenience and simplicity of description, for the specific working procedure of the device and module described above, reference may be made to the corresponding description in the device embodiments, which are no longer elaborated herein.

Although the subject here is provided in the general context that is executed in combination with the execution of an operating system and application software, a person skilled in the art may realize that other implementations may be executed in combination with another type of program module. Generally, a program module comprises a routine, a program, a component, a data structure, and another type of structure that executes a specific task or implements a specific abstract data type. A person skilled in the art may understand that the subject herein may be implemented by using another computer system configuration, which comprises a handheld device, a multiprocessor system, a microprocessor-based or programmable consumer electronic product, a mini computer, a mainframe computer, and the like, or may also be used in a distributed computing environment in which a task is executed by a remote processing device connected to a communications network. In the distributed computing environment, the program module may be located in both a local memory storage device and a remote memory storage device.

Persons of ordinary skill in the art may further appreciate that, in combination with the examples described in the embodiments herein, units and method steps can be implemented by electronic hardware or a combination of computer software and electronic hardware. Whether these functions are performed using hardware or software depends on particular applications and design constraints of the technical solutions. A person skilled in the art may use different methods to implement the described functions for each specific application. However, such implementation should not be considered as beyond the scope of the present application.

If implemented in the form of software functional units and sold or used as an independent product, the functions may also be stored in a computer readable storage medium. Based on this, the technical solution of the present application or the part that makes contributions to the prior art or the part of the technical solution can be substantially embodied in the form of a software product. The computer software product may be stored in a storage medium and contain several instructions to cause computer equipment (for example, a personal computer, a server, or network equipment) to perform all or a part of the steps of the method described in the embodiments of the present application. The foregoing computer readable storage medium comprises physical volatile and nonvolatile, removable and removable medium that is implemented by using any manner or technology of storing information such as a computer readable instruction, a data structure, a program module or other data. The computer readable storage medium specifically comprises, but is not limited to, a USB flash drive, a removable hard disk, a Read-Only Memory (ROM, Read-Only Memory), an erasable programmable ROM (EPROM), an electrically erasable programmable ROM (EEPROM), a flash drive or another solid-state memory technology, a compact disc-ROM (CD-ROM), a digital versatile disc (DVD), a high definition-DVD (HD-DVD), a Blue-Ray or another optical storage device, a magnetic tape, a disk storage or another magnetic storage device, or any other medium that can be used to store needed information and accessible by a computer.

The foregoing example embodiment is only used for describing the present application rather than to limit the present application. A person of ordinary skill in the technical field may further make various changes and modifications without departing from the spirit and scope of the present application; therefore, all equivalent technical solutions also fall within the scope of the present application, and the patent scope of the present application shall be defined by the claims.

What is claimed is:

1. A method, comprising:

transmitting, by a system comprising a processor, wireless energy to a first wireless energy receiving device with a minimum remaining energy level among multiple wireless energy receiving devices; and in a case where a value by which a first remaining energy level of the first wireless energy receiving device is higher than a second remaining energy level of a second wireless energy receiving device among the multiple wireless energy receiving devices exceeds a preset value, stopping the transmitting of the wireless energy to the first wireless energy receiving device and starting to transmit the wireless energy to the second wireless energy receiving device.

2. The method of claim 1, further comprising:

determining, according to energy information related to remaining energy levels of the multiple wireless energy receiving devices, the first wireless energy receiving device with the minimum remaining energy level among the multiple wireless energy receiving devices.

3. The method of claim 1, further comprising:

determining, according to energy information related to remaining energy levels of the multiple wireless energy receiving devices, that the value by which the first remaining energy level of the first wireless energy receiving device is higher than the second remaining energy level of the second wireless energy receiving device among the multiple wireless energy receiving devices exceeds the preset value.

4. The method of claim 2, further comprising:

acquiring the energy information of the multiple wireless energy receiving devices.

5. The method of claim 4, wherein the energy information is acquired from the multiple wireless energy receiving devices separately, or the energy information of the multiple wireless energy receiving devices is acquired from an independent device.

6. The method of claim 1, wherein phase information related to phases of multiple emitter nodes in a wireless energy sending device is recorded when the wireless energy is transmitted to the first wireless energy receiving device.

7. The method of claim 1, further comprising:
setting the preset value.

8. A device, comprising:
a processor, coupled to a memory, that executes or facilitates execution of executable modules, comprising:
a wireless energy transmission module configured to transmit wireless energy to at least one wireless energy receiving device; and
a control module configured to control the wireless energy transmission module to transmit wireless energy to a first wireless energy receiving device with a minimum remaining energy level among multiple wireless energy receiving devices, wherein the control module is further configured to control the wireless energy transmission module to: in a case where a value by which a first remaining energy level of the first wireless energy receiving device is higher than a second remaining energy level of a second wireless energy receiving device among the multiple wireless energy receiving devices exceeds a preset value, stop transmitting the wireless energy to the first wireless energy receiving device and start to transmit the wireless energy to the second wireless energy receiving device.

9. The device of claim 8, wherein the executable modules further comprise:
a determining module configured to determine, according to energy information related to remaining energy levels of the multiple wireless energy receiving devices, the first wireless energy receiving device with the minimum remaining energy level among the multiple wireless energy receiving devices.

10. The device of claim 8, wherein the executable modules further comprise:
a control configured to determine, according to energy information related to remaining energy levels of the multiple wireless energy receiving devices, that the value by which the first remaining energy level of the first wireless energy receiving device is higher than the second remaining energy level of the second wireless energy receiving device among the multiple wireless energy receiving devices exceeds the preset value.

11. The device of claim 9, wherein the executable modules further comprise:
an acquisition module configured to acquire the energy information of the multiple wireless energy receiving devices.

12. The device of claim 11, wherein the acquisition module is specifically configured to acquire the energy information from the multiple wireless energy receiving devices separately, or acquire the energy information of the multiple wireless energy receiving devices from an independent device.

13. The device of claim 8, wherein the executable modules further comprises:
a recording module configured to record when wireless energy is transmitted to the first wireless energy receiving device phase information related to phases of multiple emitter nodes in the wireless energy sending device.

14. The device of claim 8, wherein the executable modules further comprise:
a setting module configured to set the preset value.

15. A non-transitory computer readable device comprising executable instructions that, in response to execution, cause a device comprising a processor to perform operations, comprising:
transmitting wireless energy to a first wireless energy receiving device with a minimum remaining energy level among multiple wireless energy receiving devices; and
in response to a value by which a first remaining energy level of the first wireless energy receiving device is determined to be higher than a second remaining energy level of a second wireless energy receiving device among the multiple wireless energy receiving devices exceeds a preset value, stopping transmitting the wireless energy to the first wireless energy receiving device and starting to transmit the wireless energy to the second wireless energy receiving device.

16. The non-transitory computer readable device of claim 15, wherein the operations further comprise:
determining that the value exceeds the preset value according to energy information related to remaining energy levels of the multiple wireless energy receiving devices.

17. The non-transitory computer readable device of claim 16, wherein the operations further comprise:
acquiring the energy information of the multiple wireless energy receiving devices.

18. The non-transitory computer readable device of claim 16, wherein the energy information comprises information relating to a percentage of current charge relative to a full charge of at least one of the multiple wireless energy receiving devices.

19. The non-transitory computer readable device of claim 16, wherein the energy information comprises information relating to a current voltage value of a battery of at least one of the multiple wireless energy receiving devices.

20. The non-transitory computer readable device of claim 15, wherein the operations further comprise:
in response to the transmitting wireless energy to the first wireless energy receiving device, and concurrently with at least one of the first remaining energy level of the first wireless energy receiving device or the second remaining energy level of the second wireless energy receiving device being obtained, storing phase information related to phases of multiple emitter nodes of a wireless energy sending device.

\* \* \* \* \*